Nov. 29, 1949   C. MARK, JR., ET AL   2,489,715

PACKING

Filed Nov. 18, 1944

INVENTORS.
Clayton Mark Jr.,
Robert Hula,
Harold J. Alwart,
BY

Patented Nov. 29, 1949

2,489,715

UNITED STATES PATENT OFFICE 2,489,715

PACKING

Clayton Mark, Jr., Wilmette, Robert Hula, Riverside, and Harold J. Alwart, Chicago, Ill., assignors to Clayton Mark & Company, Evanston, Ill., a corporation of Delaware Application November 18, 1944, Serial No. 564,008

7 Claims. (Cl. 309—33)

This invention pertains to packings, such as cups or flange packings for plungers and plunger rods which are adapted to be used in connection with cylinders for pumping fluids, including liquids and gases, or in the operation of hydraulic or air operated cylinders.

Heretofore cups and packings of various shapes have been made of various materials, such as leather, impregnated canvas, rubber, synthetic rubber, etc., and attempts have been made to use plastics. In the conventional construction of such cups and packings there is provided a clamping or body portion which may be in the form of a transverse flange which is used to hold the packing in place, as in a cylinder, stuffing box, gland or piston, and a more or less flexible wall portion or axial flange or lip adapted to bear against the moving part or against the cylinder wall where the cup is carried by a piston.

In the use of such cups and packings the pressure of the fluid being moved or pumped, presses the flexible lip portion of the cup against the cylinder, or against the plunger rod as the case may be, thereby sealing the space between the moving parts. However, in the conventional design of cup or packing the internal or cylinder pressure pressing the flexible portion of the cup or packing against the relatively moving part, greatly exceeds the pressure required to make the seal. This causes excessive friction between the cylinder and the cup and results in a loss of power, as well as needless wear on the cup or packing.

Numerous attempts have been made to use plastics, because certain types of plastics are less expensive than the conventional materials and in many instances are not critical materials. Further, they are easy to manufacture and are better suited, chemically, for many applications. Plastic packings may be made to stand more heat than leathers and can be made with a heavier section where the strain is greatest. They are not subject to deterioration as leather cups in pitcher mouth pumps by repeated wetting and drying. Unlike rubber, most plastics are not soluble in oil, and they do not contain sulphur, which is generally present in rubber and synthetic rubber, which will form sulphides which score metal cylinders. However, plastics being nonporous, must be adequately lubricated.

An object of the invention is to provide a cup or packing so constructed and arranged that the effect of the hydraulic or gas pressure within the cylinder which flares the cup or squeezes the packing will be reduced by the construction of the cup to substantially that required for sealing the space between the working parts, thereby greatly increasing the life of the cup or packing by reducing the wear and reducing the loss of power through needless friction.

Another object of the invention is to provide a cup or packing providing a better lubrication between the relatively moving parts of a device such as a piston and its adjacent cylinder, thereby still further reducing the wear on the cup or packing and reducing the loss of power of the device utilizing said cup or packing.

Another object of the invention is to provide a cup or packing fabricated of a resilient non-porous material, such as a resilient plastic, so that lubricant can keep the adjacent working surfaces apart permitting substantially frictionless movement between the relatively moving parts.

Another object is to provide cups and packings having grooves, indentations, pockets or the like on the working surfaces thereof, so that there is a gradual reduction from cylinder pressure to suction pressure on the working surface of the cup or packing where used in a piston and cylinder construction. This pressure counteracts by substantially one-half the internal force within the cup, pressing the walls of the cup into contact with the cylinder, and similarly in the case of the packing against the plunger rod. The above referred to grooves or pockets also act as lubrication grooves spaced between bearing areas of the cup, and are necessary to lubricate a nonabsorbent cup when pumping water or the like.

Another object of the invention is to provide cups or packings having ridges forming grooves or pockets therein, being rounded so that their angle with the cylinder in the line of motion is such that the lubricant or fluid being moved will be spread between the moving parts, instead of scraping dry the bearing areas formed by the ridges.

Another object is to provide a cup packing wherein the heaviest section of the wall is at the base where the difference in pressure without and within the cup is greatest. Then the lip of the cup is made slightly oversize and the base diameter undersize, so that when the cylinder is in operation the greater force pressing the area of the cup nearest the base against the wall of the cylinder is substantially offset by the force required to stretch this heavier section of the cup into contact with the cylinder wall. Substantially the same effect is accomplished by providing resisting means for a cup having a wall of substantially constant thickness, the means being so disposed as to accomplish the desired effect.

Other advantages of plastic cups which this construction makes available is that such cups are ideal in the operation of pneumatic cylinders. Heretofore synthetic rubber has been generally used because it made a better seal for air than cups made of any other material. Rubber could not be used because it is soluble in oils and greases which must be used as the lubricant in such applications. However, synthetic rubber contains sulphur which attacks metal cylinders and forms abrasive sulphides, which greatly increases the friction and shortens the life of such cups. Plastic cups constructed in accordance with this invention entirely eliminate this difficulty.

Another object is to provide a packing or cup so designed that only that surface contacts with the adjacent working surface which is enough to seal, so that there is no unnecessary friction caused by dragging large unnecessary areas.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1:
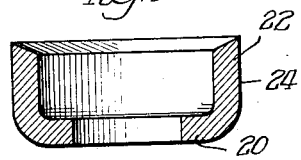
Figure 1 is a sectional elevation through a conventional form of cup.

The cup shown in Figure 1 consists essentially of the body portion 20 which takes the form of an inwardly directed annular flange and an annularly disposed lip 22 which may be said to be in the form of an axial, annular flange. The flange is designed to press tightly against the adjacent moving part as where this cup is carried by a piston which is movable within a cylinder. When the piston, therefore, is moved, moving the cup, the entire wall or outer working surface 24 of the cup bears against the cylinder wall. The cup is pressed in this position by the hydraulic pressure of the fluid, or the pressure of the gas being pumped, acting on one side of the cup at the same time that there is a vacuum or partial vacuum on the other side of the cup. This tends to more tightly seal the flange 22 against the cylinder wall.

Of course, the reverse operation may take place, that is, the packing may be carried by a stationary member and engage a relatively movable member.

Figure 2:
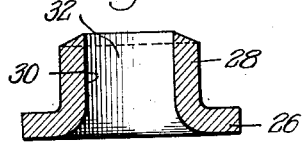
Figure 2 is a sectional elevation through a conventional form of flange packing.

The flange packing illustrated in Figure 2, comprises the body portion 26, taking the form of an outwardly directed annular flange and provided with an axially extending flange or lip 28 having the working surface 30 thereon. It may be assumed that this packing is held by a stationary member, and a movable member slides internally thereof through the aperture or passage 32. As before, the flange or lip 28 is urged into tight engagement with the movable member by virtue of the hydraulic pressure of the fluid on one side of the flange, coupled with the reduced pressure acting on the other side of the flange.

A great many of the packings illustrated in Figures 1 and 2 are formed of leather. The shape of these packings does not lend itself to successful operation of the packings where they are made of plastics, due to the fact that adequate lubrication cannot be attained, which causes excessive wear of the plastic material.

Where it is desired to use a substantially water and oil proof resilient material, the plastic may be used which is preferably chemically inert to the material with which it comes in contact. Also, under various circumstances materials such as rubber and synthetic rubber may be used. Certain plastics have been found to be successful where used with the herein contemplated packings, such plastics as enumerated below, being of the non-rigid variety. These plastics are Vinylite, which is a vinyl chloride-acetate base resin; Koroseal, which is a polyvinyl chloride base resin; Tygon, a modified vinyl base resin; Styraloy 22, an elastomeric styrene derivative, and various others, such as vinyl butyral and those of the ethyl cellulose groups. These plastics can be made of varying degrees of rigidity, depending upon the amount of plasticizer added to the resin. The more plasticizer that is added, the more flexible and less rigid the material becomes. It is preferable that a permanent plasticizer be used, such as a substantially non-migratory or non-extractible resin or chemical plasticizer, such as the polyester resinous material known as G-25 plasticizer sold by Resinous Products & Chemical Co., of Philadelphia, Pennsylvania, because the plastic then retains its characteristics in use, rather than losing some of its characteristics as where the plasticizer (where not permanent) has a greater affinity for the pumped or adjacent material.

Figure 3:
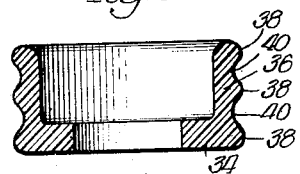
Figures 3 and 6 are sectional elevations of modified forms of cups embodying the invention.

In the packing illustrated in Figure 3, the base 34 is in the form of an annular flange and is provided with the upwardly extending lip 36 which is provided on its working face with continuous ridges or rings 38 which bear against the adjacent cylinder, for example, the ridges being separated by circular depressions 40 thereby forming crests having troughs therebetween. When in operation the hydraulic force within the cup tends to spread or squeeze the flange 36 against the adjacent working part. However, on the outside of the cup there is not just the suction pressure, but there is a graduated pressure from ridge to ridge of the pressure within the cup to the suction pressure, the average value of which is one-half the internal pressure within the cup. The force, of course, opposes the internal pressure within the cup.

Figure 4:
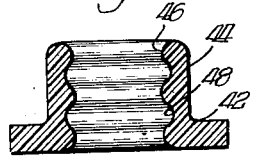
Figures 4 and 7 are sectional elevations of modified forms of flange packings embodying the invention.

In Figure 4 the flange packing comprises the base 42 and the flange or lip 44 provided with the internal rings or ridges 46 adapted to engage the adjacent working part, the rings or ridges being separated by the depressions 48. The action of this packing is similar to that described with respect to Figure 3.

Figure 6:
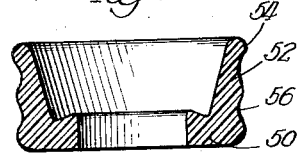
Figure 5A:
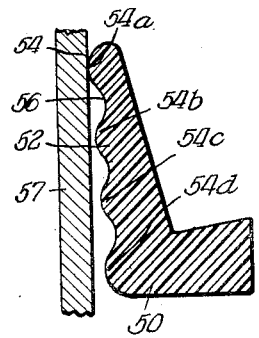
Figure 5A is an elevation corresponding to Figure 5 wherein the cup is shown free from pressure, the separation between parts of the cup flange and adjacent cylinder being shown in an exaggerated manner.
Figure 5:
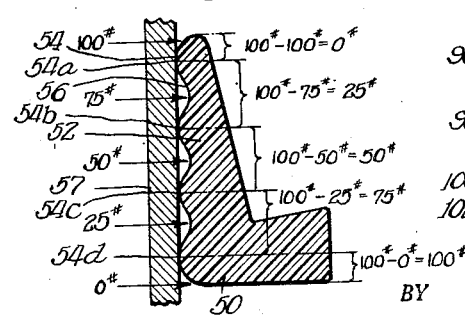
Figure 5 is an enlarged fragmentary sectional elevation through a portion of a cylinder wall and the adjacent portion of the lip and base of the form of cup illustrated in Figure 6, the showing in Figure 5 being that of a cup having the lip under pressure.

The packing illustrated in Figure 6 and the enlarged fragmentary sectional elevations illustrated in Figures 5 and 5A contemplate the body portion 50 and the flange or lip 52, the flange or lip being provided with the spaced working ridges 54 separated by the depressions 56. One more ridge is illustrated in Figures 5 and 5A than is illustrated in Figure 6. In Figure 5 the pressures are shown from ring to ring when the internal pressure in the cylinder 57 is one hundred pounds per square inch. Adding these pressures together either with the same or more or less rings and dividing by the number of rings, it is readily understandable that the external pressure preventing the cup from opening is onehalf the internal pressure. In these forms of construction the wall of the flange is so tapered as to thicken the wall at the point where there is the greatest difference between the internal and external pressures, that is, adjacent the body portion 50. This greatly stiffens the wall so that after a slight wearing in period, the elasticity of the thicker material will materially support the cup at this point, and consequently all exterior contact points, will bear evenly. In fabricating this packing it is preferably formed so that the external diameter at the extreme lip ridge 54a is greater than that of the succeeding ridges 54b, 54c, and 54d. Preferably, these ridges are formed on a taper so that they contact the cylinder wall as the pressure increases to predetermined amounts.

With the constructions shown in Figures 3 to 12 inclusive, the surface of the working rings are rounded or are disposed in a generally slanting direction facing the moving part. This causes the liquid being pumped to spread into a film between the moving parts for lubricating purposes instead of scraping the surfaces dry, as would occur in the use of the conventional packing shown in Figures 1 and 2. The formation of this lubricating film is greatly aided by the difference in pressure from ring to ring. Thus it may be said that this cup has hydraulic or forced lubrication. Lubricant under pressure continuously feeds the capillary surfaces between the moving parts so that after a short time the contacting parts are highly polished or glazed.

Figure 7:
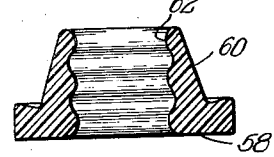

In the packing illustrated in Figure 7 the base 58 is provided with the lip 60 having the ridges 62 corresponding to the ridges 46 but the wall of the lip is tapered in the same manner and for the same purpose as that illustrated in Figure 6. It is further understood that the configurations hereafter described on the working surfaces of the cups shown in Figures 8 to 11 may be used on the flange packing herein described.

Figure 8:
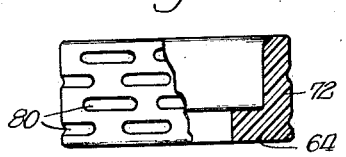
Figures 8, 9, 10 and 11 are elevations, partly in section, of modified forms of cups embodying the invention.
Figure 9:
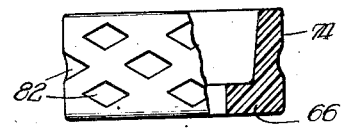
Figure 10:
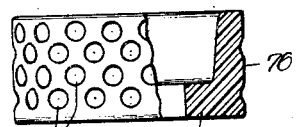
Figure 11:
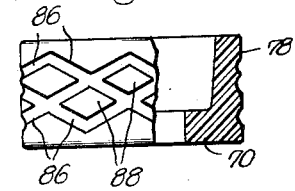

The cups shown in Figures 8 to 11 inclusive consist essentially of the base 64, 66, 68 and 70 provided with the lip 72, 74, 76 and 78, respectively, which may be tapered or not, as desired. The outer working surface of each cup is provided with different configurations of indentations. Figure 8 illustrates staggered and spaced indentations 80 which may be elongated and have rounded ends which may be said to be generally elliptical. The working surface of the cup illustrated in Figure 9 is provided with staggered and spaced, substantially diamond shaped depressions 82. The working surface of the cup illustrated in Figure 10 has substantially circular spaced and staggered dimples or depressions 84. The working surface of the cup illustrated in Figure 11 is provided with diagonally disposed, intersecting channels 86 which, in effect, form raised, substantially diamond shaped working surfaces 88.

Figure 12:
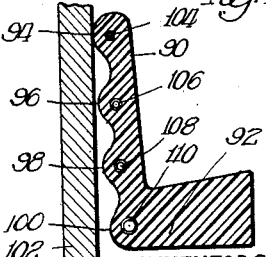
Figure 12 is an elevation corresponding to Figure 5A wherein the lip of the cup is shown of substantially constant thickness but wherein means is provided to cause the cup to perform under pressure in a manner substantially similar to that shown in Figures 5 and 5A.

In Figure 12 there is illustrated one form of cup utilizing a lip 90 having a wall of substantially constant thickness. The wall is provided with the body portion or base 92, said wall having ridges 94, 96, 98 and 100 corresponding to ridges 54a, 54b, 54c and 54d, said ridges being adapted to contact the cylinder wall 102 depending on the predetermined pressure within the cup. In order to obtain the effect of the tapered wall lip of the construction shown in Figures 5 and 5A, springs 104, 106, 108 and 110 are disposed within the wall 90 in substantially the same plane as the adjacent ridges. These springs are preferably of varying degrees of stiffness, being graduated from the stiffest spring 110 to the softest spring 104. Other gradual stiffening means may be used as a leaf spring tapering from the base to the lip or reenforcing means added inside the lip flange.

Thus in the constructions shown the walls of the lips are preferably so shaped and constructed and the material used is such that the effective ridges (or sealing means) of the lip are effective from the lip to the base i. e., the ridges, in order from the lip to the base are effective depending on the built up pressure, the ridge nearest the lip edge being in engagement with the adjacent working surface (as the cylinders 57 and 102) regardless of the pressure.

With the shaping of the packing as illustrated or referred to herein, many materials otherwise not desirable or heretofore not successful for use in packings are made available, and other forms of ridges and indentations may be used, providing packing embodying the herein invention, and it is also understood that in addition to packings illustrated, not only U-packing, but other forms as H-packings and special shapes, etc., may be used, and by the use of the term "flange" herein it is meant the portion of the packing which is axial with respect to the path of movement or that portion which engages the adjacent working surface. The body portion is that portion other than the flange and in some cases this may be eliminated, providing holding means is otherwise provided in the flange. Further the packing may be made in separate layers keyed or otherwise fastened together as separate steps. It is to be understood that this application is not to be limited by the exact embodiments of the device shown, which are merely by way of illustration and not limitation, as various and other forms of the device will, of course, be apparent to those skilled in the art without departing from the spirit of the invention or the scope of the claims.

We claim:

1. A packing member composed of a non-rigid, non-porous plastic, substantially chemically inert to the substances coming in contact therewith, said packing member having a body portion provided with an axial flange, said flange tapering from said body portion whereby it is thicker adjacent the body portion than at the free edge of the flange, one surface of said flange being provided with rounded ridges separated by rounded depressions, said ridges and depressions being parallelly arranged circumferentially of said flange and disposed continuously over substantially the entire working surface of said flange, the outside diameters of said ridges progressively changing whereby when the packing member is under a no-load condition only the ridge adjacent the free edge of the flange engages the working member with which the working surface of the flange is adapted to engage.

2. A packing member composed of a non-rigid, non-porous plastic, substantially chemically inert to the substances coming in contact therewith, said packing member having a body portion provided with an axial flange, said flange being progressively re-enforced from the body portion to adjacent the free edge of the flange, one surface of said flange being provided with rounded ridges separated by rounded depressions, said ridges and depressions being parallelly arranged circumferentially of said flange and disposed continuously over substantially the entire working surface of said flange, the outside diameters of said ridges progressively changing whereby when the packing member is under a no-load condition only the ridge adjacent the free edge of the flange engages the working member with which the working surface of the flange is adapted to engage.

3. A packing member composed of non-rigid, non-porous material, said packing member having a body portion provided with an axial flange, one surface of said flange being provided with rounded ridges separated by rounded depressions, said ridges and depressions being parallelly arranged circumferentially of said flange and disposed continuously over substantially the entire working surface of said flange, the outside diameters of said ridges progressively changing whereby when the packing member is under a no-load condition only the ridge adjacent the free edge of the flange engages the working member with which the working surface of the flange is adapted to engage.

4. A packing member composed of non-rigid, non-porous material, said packing member having a body portion provided with an axial flange, one surface of said flange being provided with rounded ridges separated by rounded depressions, said ridges and depressions being parallelly arranged circumferentially of said flange and disposed continuously over substantially the entire working surface of said flange, the ridge adjacent the free edge of said flange rounding over said edge, and the ridge adjacent the body portion rounding into the bottom surface of said body portion.

5. A packing member composed of non-rigid, non-porous material, said packing member having a body portion provided with an axial flange, one surface of said flange being provided with rounded ridges separated by rounded depressions, said ridges and depressions being parallelly arranged circumferentially of said flange and disposed continuously over substantially the entire working surface of said flange, the ridge adjacent the free edge of said flange rounding over said edge, and the ridge adjacent the body portion rounding into the bottom surface of said body portion, the outside diameters of said ridges progressively changing whereby when the packing member is under a no-load condition only the ridge adjacent the free edge of the flange engages the working member with which the working surface of the flange is adapted to engage.

6. A packing member composed of a non-rigid, non-porous plastic, substantially chemically inert to the substances coming in contact therewith, said packing member having a body portion provided with an axial flange, said flange being progressively re-enforced from the body portion to adjacent the free edge of the flange, one surface of said flange being provided with rounded ridges separated by rounded depressions, said ridges and depressions being parallelly arranged circumferentially of said flange and disposed continuously over substantially the entire working surface of said flange, the outside diameters of said ridges progressively changing whereby when the packing member is under a no-load condition only the ridge adjacent the free edge of the flange engages the working member with which the working surface of the flange is adapted to engage, the re-enforcement in said flange comprising resilient means urging said flange in a direction toward the working member.

7. A packing member composed of a non-rigid, non-porous plastic, substantially chemically inert to the substances coming in contact therewith, said packing member having a body portion provided with an axial flange, said flange being progressively re-enforced from the body portion to adjacent the free edge of the flange, one surface of said flange being provided with rounded ridges separated by rounded depressions, said ridges and depressions being parallelly arranged circumferentially of said flange and disposed continuously over substantially the entire working surface of said flange, the outside diameters of said ridges progressively changing whereby when the packing member is under a no-load condition only the ridge adjacent the free edge of the flange engages the working member with which the working surface of the flange is adapted to engage, the reenforcement in said flange comprising resilient means urging the ridges in a direction toward the working member.

CLAYTON MARK, Jr.
ROBERT HULA.
HAROLD J. ALWART.

REFERENCES CITED

The following references are of record in the file of this patent:

UNITED STATES PATENTS

| Number | Name | Date |
| --- | --- | --- |
| 1,287,285 | Gammeter | Dec. 10, 1918 |
| 2,036,038 | Gottlieb | Mar. 31, 1936 |
| 2,052,762 | Gits | Sept. 1, 1936 |
| 2,134,302 | Haushalter | Oct. 25, 1938 |
| 2,214,261 | Roth | Sept. 10, 1940 |
| 2,218,638 | Christenson | Oct. 22, 1940 |
| 2,318,757 | Christenson | May 11, 1943 |

FOREIGN PATENTS

| Number | Country | Date |
| --- | --- | --- |
| 437,477 | Great Britain | of 1935 |